Nov. 6, 1962   J. E. P. VERNEAUX   3,062,170
METHOD OF PUSHING TRAINS OF PUSHED ELEMENTS AND COUPLERS
BETWEEN ELEMENTS FOR CARRYING OUT SAID METHOD
Filed April 2, 1958   5 Sheets-Sheet 1

Nov. 6, 1962   J. E. P. VERNEAUX   3,062,170
METHOD OF PUSHING TRAINS OF PUSHED ELEMENTS AND COUPLERS
BETWEEN ELEMENTS FOR CARRYING OUT SAID METHOD
Filed April 2, 1958   5 Sheets-Sheet 3

United States Patent Office 3,062,170
Patented Nov. 6, 1962

3,062,170
METHOD OF PUSHING TRAINS OF PUSHED ELEMENTS AND COUPLERS BETWEEN ELEMENTS FOR CARRYING OUT SAID METHOD
Jean Eugène Paul Verneaux, Paris, France, assignor of three-fourths to Chantiers Navals Franco-Belges, Villeneuve-la-Garenne, France
Filed Apr. 2, 1958, Ser. No. 725,843
Claims priority, application France Apr. 8, 1957
14 Claims. (Cl. 114—235)

This invention relates to improvements to the method of pushing trains of pushed elements, to couplers between such elements and to their applications, notably in the constitution of a train of pushed boats intended more particularly for inland and sea navigation.

The trains of pushed elements utilized up to now are either rigid or adapted to have their shape modified by means of mechanisms provided internally of the train element which permit only moderate elastic deformations under the influence of external forces. In certain known embodiments of pushed trains of variable shape a push member is used which rotates freely about a hinge pin located at the rear of the train while the actual steering is effected by means of the rudder of the boat or barge receiving the thrust from the push member. Although the directional stability is satisfactory in this last case the same does not apply to the other cases for the elements of the train have a definite tendency to turn back and to come along each other stern against bow, unless the relative position of two successive elements is fixed by means of undeformable geometrical members.

Now it is the main object of this invention, on the one hand, to avoid the drawbacks broadly set forth hereinabove and, on the other hand, to facilitate inland navigation, even in short-radius curves, as well as sea navigation on a swelling sea, while utilizing conventional-type boats and without modifying their form.

Another object of the present invention is to provide an increasing in the length of the train of pushed elements when it tends to take a curved form under the influence of deflecting forces generated by the current of water, by the rudder means of the train or by devices modifying the geometrical structure of the couplers, and the reduction of its length to a minimum, that is, until a zero misalignment is obtained between its successive elements, under the only action of the thrust generated by the pushing element of the train to which it is subjected when said deflecting forces have disappeared.

For this purpose, according to the invention, the method for pushing a train of pushed elements such as conventional boats, boats provided with carrier wheels, crawler-tracks, supporting surfaces, consists in interconnecting two successive elements of the train in a reversible, kinematic, dynamic and positive manner in order to generate, for any angular deflection of one of said elements relative to the other, an increasing of the distance between each other with a removal of their instantaneous center of rotation from their longitudinal planes of symmetry, these increasing and removal being all the more great as said angular deflection increases, such an interconnection tending therefore to maintain and to automatically restore the alignment of said elements under the only action of the thrust applied to the train by the pushing element thereof.

Another object of the present invention is to provide between two successive elements of the train a steering device symmetrically disposed relative to the coinciding longitudinal planes of symmetry of the aligned elements and longitudinally guided on supports pivotally mounted on said elements at least around vertical axes, and a device for mutually transmitting the thrust between the elements the thrust applied to the train by its pushing element, having an adjustable length and connected to said supports by reversible positive connections bearing on points fixed on said elements, which connections are determined so that as soon as a deviating torque generated by a deviation of the current of water or of the train rudder means or by a modification of the geometrical structure of the couplers destroys the alignment of the two elements, said supports move away from each other along the steering device by a distance greater than the mean distance of said elements if directly pivoted between each other around a common apex of their adjacent ends by an angle equal to the deflection angle while simultaneously applying to said steering device a righting torque generated by said thrust. The stable position of the train having a curved shape is attained when the value of the increasing righting torque applied to the steering device attains that of the deviating torque having generated the angle of deflection.

Other advantageous features of this invention will appear as the following description proceeds with reference to the accompanying drawings forming part of this specification and illustrating diagrammatically by way of example the manner in which the invention may be carried out in the practice. In the drawings.

Figure 1:
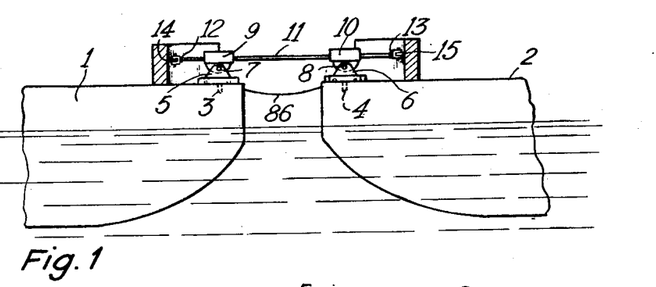
FIGS. 1 and 2 are fragmentary elevational and plane views, respectively, showing two successive elements of a train of pushed boats provided with a coupling device according to a first embodiment of the invention.
Figure 2:
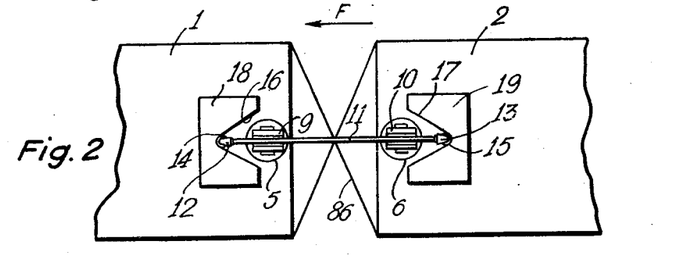
Figure 3:
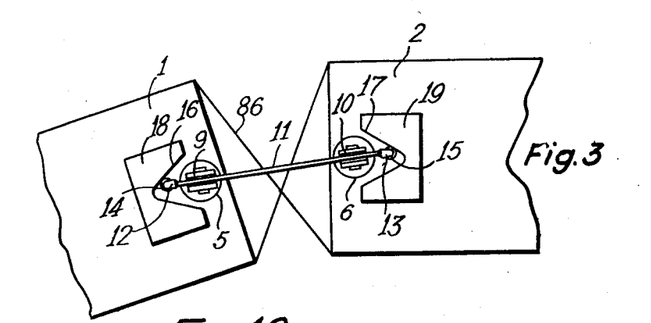
FIG. 3 is a view similar to that of FIG. 1, one of the successive elements of the train having undergone an angular deflection relative to the other.

In the embodiment illustrated in FIGS. 1 to 3, the two successive boats 1 and 2 which are pushed in the direction of the arrow F carry in the vicinity of their adjacent ends vertical arbors 3 and 4 on which are pivotally mounted yokes 5 and 6 carrying horizontal pins 7 and 8 perpendicular to the coinciding longitudinal planes of symmetry of the boats in aligned condition and having pivotally mounted thereon a pair of registering grooved supports 9 and 10 in which a bar 11 acting both as a thrust bar and a steering bar is slidably fitted.

The ends of the thrust and steering bar 11 are provided with yokes 12 and 13 longitudinally fixed on said bar adapted to pivot freely about the longitudinal axis of this bar. These yokes carry rollers 14 and 15 engaging V-shaped vertical cams 16 and 17 formed on members 18 and 19 secured on the boats 1 and 2 and acting as devices for increasing the distance between said boats. Said cams symmetrically disposed with respect to the longitudinal planes of symmetry of said boats have their apices respectively directed towards the centers of the boats. From the apex of the V the points of their profile are situated at decreasing distances from the arbors 3 and 4.

When the boat 1 is caused to diverge from its aligned position with the boat 2 by turning port under the action of deviating forces, as illustrated in FIG. 3, the thrust and steering bar 11 becomes inclined relative to the two boats, thus causing the grooved supports 9, 10 to pivot around the arbors 3, 4 and inducing a relative pivotal movement between itself and the cams around said arbors 3, 4. Such a pivotal movement generates an angular displacement of the ends of said bar in the starboard direction around said arbors 3, 4, i.e. in a direction which is reversed with respect to that of the angular displacement of said boats between each other, said ends moving away from the apices of said cams along the starboard sides of the latter. The distance between the axes of rollers 14, 15 and those of arbors 3, 4 decreases due to the shape of said cams, which generates an increasing in the distance between boats 1 and 2 due to the resulting projection of bar 11 from said boats and therefore an increasing in length of the train. In this configuration, the thrust exerted by the tail pushing boat of the train and transmitted by the pushing boat 2 is applied to roller 15 by the V-shaped cam 17 thus generating a force perpendicular to said cam and directed in the port direction of boat 2. Simultaneously under the action of said V-shaped cam 17 the roller 14 exerts on the V-shaped cam 16 a force directed in the starboard direction of boat 1 and balanced by the hydrodynamic efforts to which said boat 1 is subjected. Said two forces create a torque applied to the bar 11, which torque tends to bring back the two grooved supports 9, 10 in alignment with the longitudinal axis of boat 2 and, therefore, to right the train while reducing its length to a minimum, as soon as the deviating forces disappear. The pivoting movement of yokes 12, 13 about said bar 11 and the displacement of said bar in the longitudinal planes of symmetry of said grooved supports 9, 10 allow the two boats to move relatively to each other under the influence of rolling and pitching.

Figure 4:
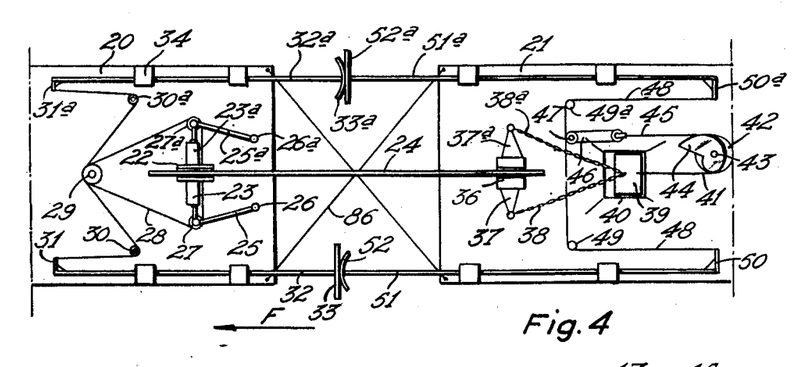
FIGS. 4 and 5 are fragmentary plane and elevational views, respectively, showing two successive elements of a train of pushed boats equipped with coupling devices according to two other embodiments of this invention, respectively.
Figure 5:
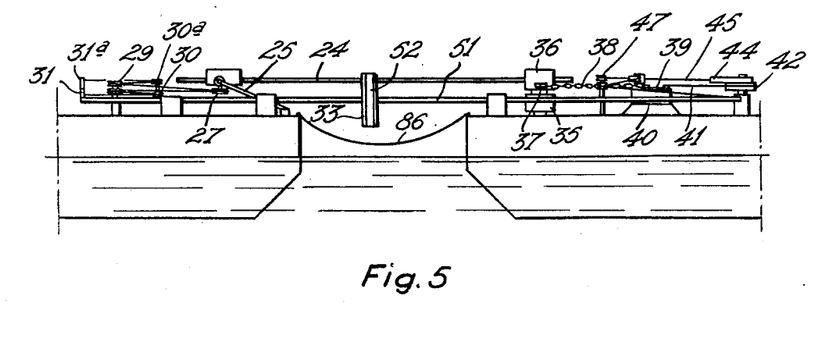
Figures 6, 19, 20, 21:
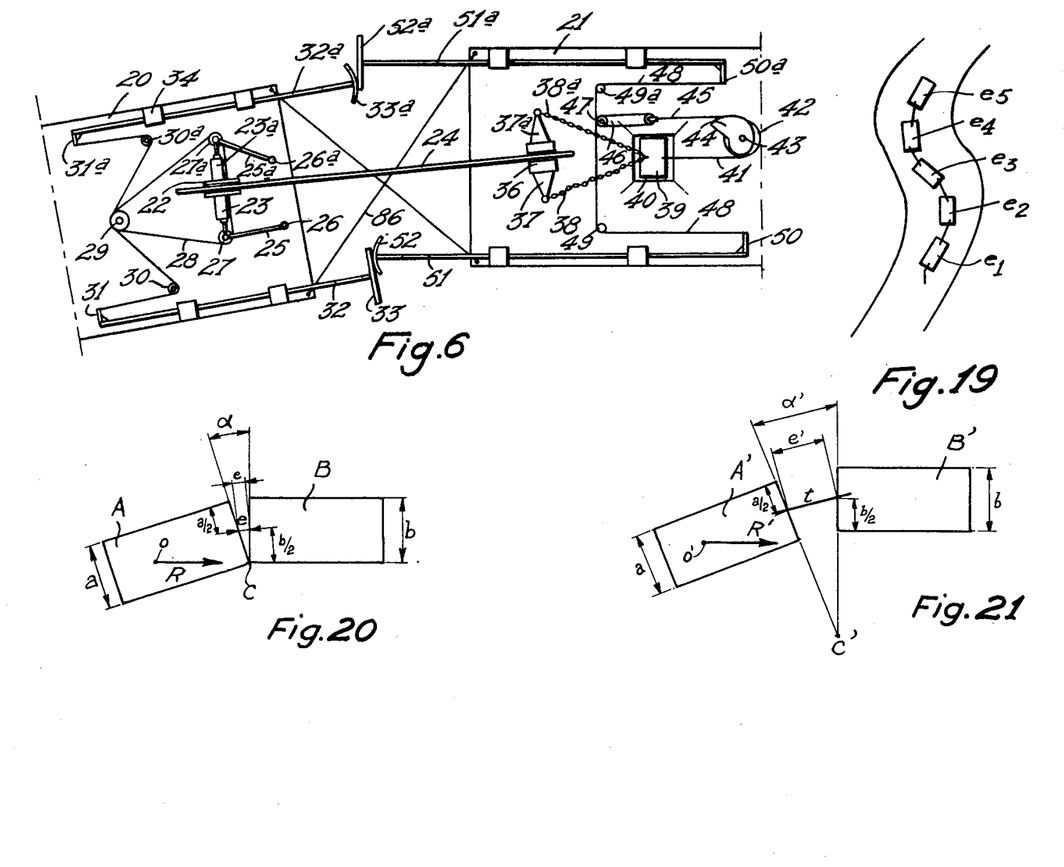
FIG. 6 is a view similar to that of FIG. 4, one of the successive elements of the train having undergone an angular deflection relative to the other.
FIG. 19 diagrammatically illustrates the shape of a train of pushed boats equipped with couplers and train bending devices according to the invention, when negotiating S-shaped curves in river navigation.
FIGS. 20 and 21 diagrammatically illustrate the forces applied to a deflected boat of a pushed train, equipped with couplers respectively conventional and according to the invention.

In the embodiment illustrated in FIGS. 4 to 6 the coupler between the boats 20 and 21 comprises a grooved support 22 integral with two opposed aligned arms 23 and 23a, mounted on the boat 20 and formed with a relatively deep groove adapted to be slidably engaged by a steering bar 24. The arms 23 and 23a at right angles to the coinciding longitudinal planes of symmetry of the boats in aligned condition are pivoted at their ends on a pair of levers 25, 25a pivoted in turn on the boat at 26, 26a and which converge toward the transversal edge of boat 20 close to said support 22 and act as a distance increasing means. These arms carry at their pivot points a pair of pulleys 27, 27a engaged by a funicular connection consisting of a cable 28 passing also over a central double return pulley 29 secured on the boat, and over a pair of side return pulleys 30 30a secured on either side of the central pulley 29 on the boat; finally, this cable 28 leads to end brackets 31, 31a secured on the adjacent extremities of thrust bars 32, 32a guided in bearing members 34 and carrying on their other ends projecting from the boat buffers 33, 33a. This cable forms a deformable symmetrical crooked line, two symmetrical vertices being at the pulleys 30 and 30a which are secured to the boat.

Figure 7:
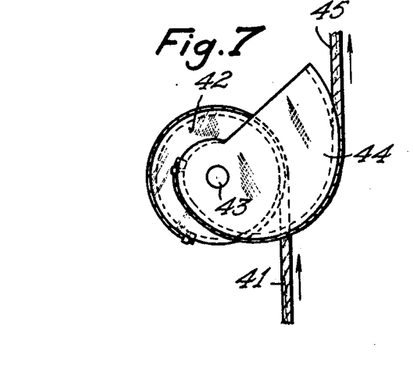
FIG. 7 illustrates on a larger scale a cam utilized in one of the couplers of the device illustrated in FIGS. 4 and 5.

Mounted on the pushing boat 21 is a bearing socket 35 having pivotally mounted therein a grooved support 36 provided with two opposed aligned arms 37, 37a and with a deep groove which acts as a guide means for the axially-sliding steering bar 24. The arms 37, 37a at right angles to the coinciding longitudinal planes of symmetry of the boats in aligned condition carrying a pair of chains 38, 38a acting as yielding connecting-rods and connected to a slide 39 longitudinally movable in adequate slideways 40 carried by the boat. This slide 39 has secured thereon a cable 41 passing over a pulley 42 the pivot pin 43 of which is secured on the boat and acts at the same time as a mounting pin to a grooved pulley 44 having a spiral arc contour (FIG. 7), keyed on the pulley 42 and engaged by a cable 45 connected to a pulley block 46 comprising a double pulley 47 secured on the boat, a funicular connection consisting of a cable 48 passing over said pulley block 46 subsequently leads to a pair of return pulleys 49 and 49a also secured on the boat, and finally to brackets 50, 50a secured at the ends of thrust bars 51, 51a provided with buffers 52, 52a at their other ends projecting from the boat 21. The pulley block and the interconnected pulleys 42 and 44 act as a distance increasing means.

When the boat 20 is caused to diverge from its postion in alignment with the boat 21 by turning port, as illustrated in FIG. 6, the steering bar becomes inclined relative to the two boats. On boat 20 such an inclination causes the symmetrical pentagon formed by levers 25, 25a and cable 28 passing over pulleys 27, 27a and 29, to be deformed by the pivotment of levers 25 and 25a around points 26 and 26a. Said deformation induces a relative pivotal movement between said bar 24 and levers 25, 25a about a vertical axis passing through the point of convergence of said levers, which generates an angular displacement of said bar with respect to boat 20 toward starboard, i.e. in a reverse direction with respect to the port deflection of said boat. Under the action of the resulting transversal displacement of the grooved support 22 combined with the inclination of said support the arm 23a stretches the cable 28 in a direction opposite to that of the thrust exerted by the tail pushing boat of the train and transmitted by the pushing boat applied on buffer 33 by buffer 52. Under the influence of the resulting tractive effort, the thrust bar 32a tends to project further from the stern of boat 20.

Under the action of the steering bar 24 the grooved support 36 mounted on boat 21 pivots around the bearing socket 35 and the arm 37a stretches the chain 38a while the chain 38 becomes slack. The slide 39 is moved in slideways 40 which causes the pulley 42 to pivot around the pivot pin 43 and therefore the spiral-shaped pulley 44 to rotate. By means of cable 45 and pulley block 46 tractive efforts directed in opposite directions are exerted on the port and starboard sides of cable 48. Said movements induce a relative pivotal movement between said bar 24 and said pulley block 46 and interconnected pulleys 42, 44 around the vertical axis of bearing socket 35, which generates an angular displacement of said bar toward port with respect to boat 21, i.e. in a reverse direction with respect to the relative displacement of said boat 21 toward starboard with respect to boat 20. The tractive effort exerted on the port side of said cable 48 has a direction opposite to that of the reactive effort applied on buffer 51 by buffer 33, while the thrust bar 51a tends to project further from the bow of boat 21. Buffers 32 and 32a always remain in contacting engagement. The steering bar 24 moves in the deep grooves of the supports 22 and 36 while moving back with respect to guide member 22 and advancing with respect to guide member 36, which thus allow an increasing in the distance between boats 20 and 21, due to the resulting projection of said bar from said boats, and therefore an increasing in length of the train.

By the action of the deformable trapezoid formed by arms 23, 23a and levers 25, 25a for boat 20 and by amplification under the action of the pulley block 46 and interconnected pulleys 42, 44 for boat 21, the thrust exerted by the thrust bars is transformed in relation to the deflection angle, into a torque which is applied to the steering bar 24 by the grooved supports 22 and 36 in order to right the train. The rolling and pitching movements of a boat relative to the other are allowed by the displacements of the steering bar in the vertical longitudinal planes of symmetry of said supports.

The boats 20 and 21 are illustrated in FIGS. 4 to 6 as being equipped with two different half-couplers. They may be both provided with the half-couplers illustrated in connection with each of them.

Figure 8:
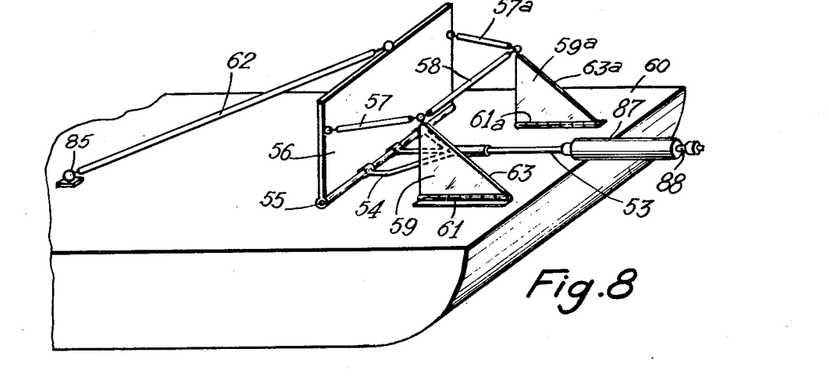
FIG. 8 is a fragmentary perspective view of a boat equipped with a half-coupler according to a fourth embodiment.

In the embodiment illustrated in FIG. 8 a thrust and steering bar 53 carries at its ends a fork 54 hingedly mounted by means of swivelling eyes on a shaft 55 secured at the lower part of a transverse plate 56 acting as a device for increasing the distance between the boats. Two non-parallel bars 57, 57a are pivotally mounted by means of swivel-joints on points of said member 56 located closer to the upper edge than to the lower edge of said member. The other ends of said bars carry ball and socket joints on which are pivotally mounted the ends of a cross-bar 58 and the upper apices of two triangular plates or supports 59, 59a hingedly mounted on boat 60 by means of longitudinal hinges 61, 61a. The middle point of the upper edge of said transverse plate 56 is connected by a ball and socket joint to a righting bar 62 connected to boat 60 by means of a ball and socket joint. At rest the assembly is symmetrically disposed relative to the longitudinal plane of symmetry of boat 60.

Bars 57, 57a and 62 may be replaced by chains. Similarly the triangular plates may be replaced by two vertical uprights disposed as their vertical edges and secured on the element by means of bearing sockets and by chains disposed as their oblique edges 63, 63a and interconnecting the cross-bar 58 and the element.

When the boat 60 turns port, the thrust and steering bar 53 causes the transverse plate 56 to move and to incline starboard around the instantaneous center of rotation of said member as defined by its supporting elements. Thus said bar and transverse plate are displaced in a relative pivotal movement around the vertical axis passing through said center while said bar is angularly displaced toward starboard with respect to boat 60. The deformable quadrilateral formed by bars 57, 57a, 58 and member 56 is warped. The point of fixation of bar 62 on said member is moved towards the bow of boat 60 thus generating a shortening of the common perpendicular to the shaft 55 and the bar 58. The middle point of said shaft 55 comes nearer the transversal plane of displacement of said bar 58, i.e. moves towards the stern of boat 60, causing the thrust and steering bar 53 to move toward said stern and to project from said boat. Thus the coupling is elongated at a determined value for a given deflection angle between successive elements which induces an increasing in the distance between said elements. The rolling movements are absorbed by the angular movements of bars 57 and 57a.

Figure 10:
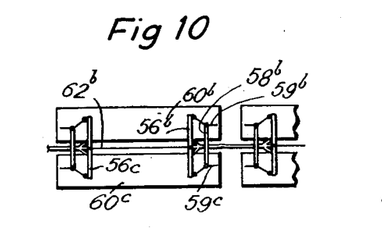
FIGS. 10 and 11 are diagrammatic plane views showing the utilization of couplers of the kind illustrated in FIG. 8 for trains comprising laterally joined elements.
Figure 11:
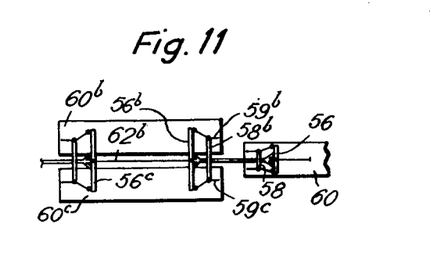

The device illustrated in FIG. 8, instead of being used for coupling two successive elements, may be used for coupling pairs of laterally joined elements, as illustrated in FIG. 10, or, as illustrated in FIG. 11, for coupling a pair of laterally joined elements and a single element. For this purpose the cross-bar 58b and the distance increasing transverse plate 56b straddle the contiguous edges of the laterally joined elements 60b, 60c on which the triangular plates 59b, 59c are respectively hinged. The righting bar 62b may be connected either to a common point of the contiguous edges of elements 60b, 60c or to the second distance increasing transverse plate 56c of the same pair. This last mounting may be used in the case where successive elements are coupled, as illustrated in FIG. 8.

The contour of cams 16 and 17 (FIG. 3), the levers 25, 25a and pulley block 46 (FIG. 4) or the transverse plate 56 (FIG. 8) allow the elongation of the coupling to be adjusted so that said elongation be greater than the mean distance of the boats when pivoted between each other around a common apex of their contacting ends by an angle equal to the angular deflection existing between said boats. Thus even for great deflection angles the stability of the system is ensured.

In fact, when considering two boats A, B (FIG. 20) pivoted between each other around their common apex C, the pushed boat A angularly offset by $\alpha$ relative to the pushing boat B is brought back in alignment with boat B as long as the direction of the hydrodynamic effort R applied to said boat A through its center of lateral resistance O passes on the starboard side of the center of curvature C and is urged stern against bow along the pushing boat B if said direction passes on the port side of C. When said direction passes through C the maximum means distance $e_{max}$ between boats A and B having respective widths $a$ and $b$ is given by the formula:

$$\frac{1}{2}\sqrt{a^2+b^2-2ab\cos\alpha_{max}}=e_{max}.$$

$\alpha_{max}$ being the maximum possible angle of deflection for which a righting torque is still generated.

In the coupling system of the present invention the pushed boat A' (FIG. 21) is angularly offset by $\alpha'$ relative to the pushing boat B' by pivoting around the instantaneous center of rotation or curvature center C' through which passes the resultant of the thrust and of the torque which are applied to A' by the thrust bar $t$. The direction of the hydrodynamic effort R' applied to said boat A' through its center of lateral resistance O' passes on the starboard side of said center of curvature C' and tends to bring back the pushed boat A' in alignment with the pushing boat B' even for angles of deflection $\alpha'$ notably greater than $\alpha$. The stability is increased while the boats A', B' move away from each other by a mean distance $e'$ greater than $e$ for $\alpha'=\alpha$. $e'_{max}$ is greater than $e_{max}$ while $\alpha'_{max}$ is greater than $\alpha_{max}$.

Figure 12:
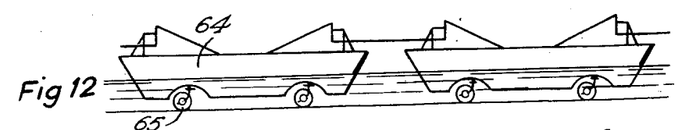
FIG. 12 is a diagrammatic view showing two successive elements of a train of pushed boats equipped with carrier wheels.
Figure 13:
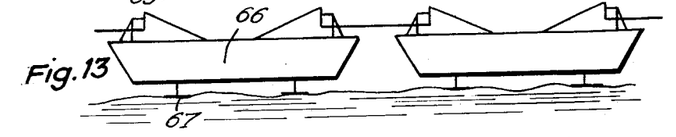
FIG. 13 is a diagrammatic view showing two successive elements of a train of pushed boats equipped with supporting fins or lifting surfaces.
Figure 14:
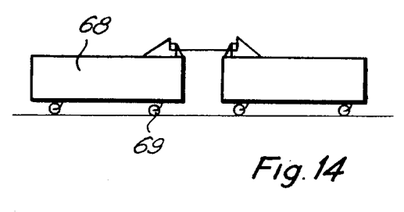
FIG. 14 is a diagrammatic view showing two successive elements of a train of pushed land trailers equipped with swivelling wheels.

FIGS. 12 to 14 illustrate diagrammatically the use of a coupling device according to this invention, on the one hand, between two successive elements of a pushed train of boats 64 provided with wheels 65 for clearing sandshoals (FIG. 12), on the other hand, between two successive elements of a pushed train of boats 66 provided with supporting or lifting surfaces 67 adapted to carry part or the whole of the boat weight (FIG. 13) and, finally, between two successive elements of a pushed train of land trailers 68 provided with swivelling wheels 69 (FIG. 14).

Figure 15:
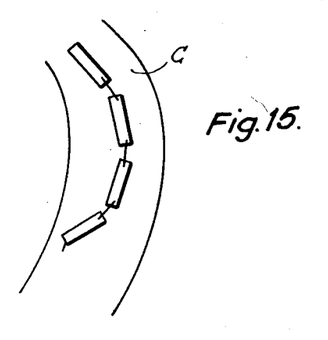
FIG. 15 diagrammatically illustrates the shape of a train of pushed boats equipped with couplers and train bending devices according to the invention, when negotiating a curve in river navigation.

The train of pushed boats equipped with coupling devices of the type illustrated in FIGS. 1 to 11, is further provided with curving devices adapted to voluntarily curve the train more particularly for negotiating a curve in inland navigation, such as the curve C of FIG. 15. Such a curving action may be obtained by providing the front boat of the train with a front rudder means.

The curving may also be performed either by modifying the geometrical structure of the coupling devices (FIGS. 16 and 17) or by applying to said coupling devices a temporary internal force which deforms said devices (FIG. 18), with a view to momentarily modify the symmetry of the system by substituting a stable predetermined misalignment for the zero basic misalignment.

Figure 16:
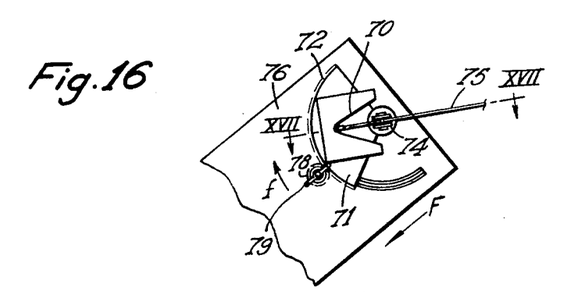
FIGS. 16 and 17 are respectively plan and elevational views illustrating a train bending device according to the invention, which modifies the geometrical shape of the positive connections.
Figure 17:
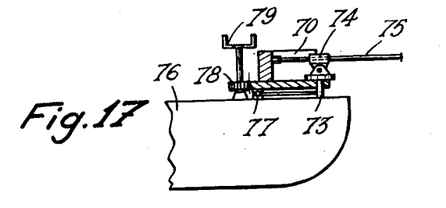

In the curving device illustrated in FIGS. 16 and 17 as applied to the coupler illustrated in FIGS. 1 and 2, the V-shaped cam 70 is mounted on a plate 71 provided with peripheral teeth 72 and pivotally mounted around the pivot pin 73 carrying the grooved support 74 guiding the thrust and steering bar 75. Said plate bears on a horizontal bearing 77 and is rotatably driven about said pivot pin 73 by means of a toothed wheel 78 controlled by a handle 79. If plate 72 is rotatably driven in the direction of arrow $f$, the thrust and steering bar 75 tends to return towards the edge of the V-shaped cam 70 which causes the boat 76 to be angularly offset relative to the pushing boat as illustrated in FIG. 3. If boat 76 is provided with a front curving device similar to the one illustrated in FIGS. 16 and 17, the plate of said front curving device is caused to rotate in a reverse direction with respect to that of said arrow $f$. A similar curving device may be associated to the couplers illustrated in FIG. 4, the grooved supports being secured on the plate which will be moved relative to the opposed aligned arms.

Figure 18:
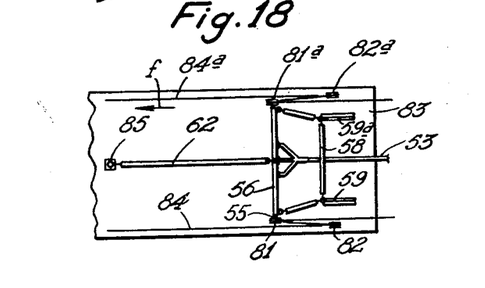
FIG. 18 is a plane view illustrating a train bending device according to the invention which applies a temporary force to the coupler illustrated in FIG. 8.

In the curving device illustrated in FIG. 18 as applied to the coupler shown in FIG. 8, the lower shaft 55 carried by the distance increasing transverse plate 56 supports two pulleys 81 and 81a. Two cables 84, 84a respectively pass over said pulleys 81, 81a, over return pulleys 82, 82a carried by the boat 83 and over the similar pulleys of the other boats of the train.

Figure 9:
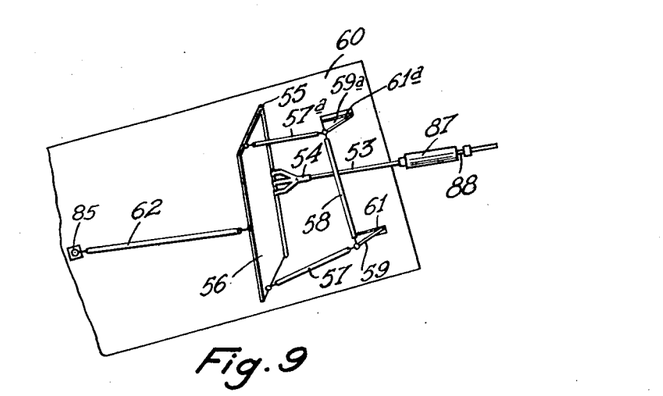
FIG. 9 is a fragmentary plane view of the boat and half-coupler illustrated in FIG. 8, said boat having undergone an angular deflection relative to the preceding boat.

If a tractive effort is exerted on cable 84a in the direction of arrow $f$, the pulley 81a comes nearer pulley 82a and the train tends to be curved as illustrated in FIG. 9. If the tractive effort is exerted on cable 84 the train is curved in the reverse direction.

The last curving device is only given by way of example, any dissymmetry in the coupler shown in FIG. 18 being useable for curving the train equipped with couplers as shown in FIG. 8. Such a dissymmetry may be obtained by modifying either the position of pulleys 81 and 81a relative to the distance increasing transverse plate 56, or that of the thrust and steering bar 53 relative to the shaft 80 or that of point 85 on the boat.

The curving devices already described may be used for modifying the alignment of the boats of the train with a view to give to said train an S-shape for negotiating two successive curves of a river having reverse curvatures as illustrated in FIG. 19.

If the curving devices of the train are of the type illustrated in FIGS. 16 and 17, the plates 71 are caused to rotate in the direction of arrow $f$ at the rear of boats $e_2$ and $e_3$ and at the front of boats $e_3$ and $e_4$ while said plates will be caused to rotate in a reverse direction relative to that of $f$ at the front of boats $e_1$ and $e_2$ and at the rear of boats $e_4$ and $e_5$.

If the curving devices of the train are of the type illustrated on FIG. 18, cables 84 and 84a are fixed in any known manner on boat $e_3$ with a view to pull on the portion of cable 84a passing over the rear half-coupler of said boat $e_3$ and over the couplers of boats $e_2$ and $e_1$ while the portion of cable 84 passing over the front half-coupler of said boat $e_3$ and over the couplers of boats $e_4$ and $e_5$ is subjected to a tractive effort.

The coupling system is completed by positive connecting or linkage means between the successive elements, such as a pair of slack crossed cables 86, as illustrated in FIGS. 1 to 7.

For decreasing the effects of rolling and yawing a conventional filter consisting of a spring, an inertia block or weight and a damper may be associated with the coupler.

Finally, in order to avoid the necessity of displacing an important mass of water between the successive boats of the train when said train is in aligned condition, the length of the thrust bars may be adjusted by means of a shortening device controlled for example by the pilot so that the facing ends of the boats may be put in contacting engagement.

Thus, as illustrated in FIG. 8 by way of example, the thrust and steering bar 53 comprises two parts one of which is secured on the body 87 of a double-acting hydraulic jack while the other is connected to the piston of said jack. Such an embodiment may be used for the thrust bar or bars of any coupler shown in the accompanying drawings. The hydraulic jacks of the train are connected to main pipes ending at a control station. For the same purpose, in the case of the coupler illustrated in FIG. 8 the thrust and steering bar may be replaced by a scissors-shaped device.

What I claim is:

1. A coupler for train of pushed elements such as boats, of the type comprising a tail element generating the thrust for displacing the train, comprising, in combination, between two successive pushing and pushed elements of the train, a steering bar disposed in the coinciding longitudinal planes of symmetry of the elements in aligned condition and longitudinally and obliquely displaceable with respect to each element in horizontal and vertical planes, means for guiding said bar on said elements, means for transmitting the thrust exerted by the pushing element on the pushed element, devices for increasing the distance between said elements respectively carried by the two elements and on which act said thrust transmitting means and means for causing said bar and distance increasing devices to mutually act on each other, each distance increasing device and said bar being relatively displaceable between each other by a pivotal movement around a vertical axis fixed with respect to the element corresponding to said device in order to simultaneously impart to said bar with respect to said element, for any angular deflection of said element with respect to the previously aligned elements under the action of deviating forces, an angular displacement in a reversed direction and a relative longitudinal displacement which causes said bar to project from said element whereby, at the time such an angular deflection exists, the thrust transmitting means applies to said bar by means of said distance increasing device a righting torque which tends, as soon as said deviating forces disappear, to realign the elements while bringing them at their initial distance.

2. A coupler according to claim 1 further comprising curving means adapted to generate the relative pivotal movement around the vertical axis between the steering bar and each distance increasing device with a view to create an ordered dissymmetry of the coupler in order to curve the train.

3. A coupler according to claim 1 wherein, for one element, the means for transmitting the thrust, for guiding the steering bar, and for causing said steering bar and the corresponding distance increasing device to mutually act on each other comprise a pair of thrust bars projecting from the element and slidably mounted on either side of said element, a central support provided with a longitudinal groove engaged by the steering bar, opposed aligned arms mounted on said support and disposed at right angles to the longitudinal plane of symmetry of the element in aligned condition with the other element, a funicular connection interconnecting the non-projecting ends of said thrust bars and said support and disposed according to a deformable symmetrical crooked line, one side of which is formed by said aligned arms over the ends of which said connection passes while two symmetrical vertices of said crooked line are fixed on said element, the corresponding distance increasing device consisting of two levers carrying the support, converging toward the transversal edge of the element close to said support and articulated on said element.

4. A coupler according to claim 3 further comprising, a curving device adapted to generate the relative pivotal movement around the vertical axis between the steering bar and the distance increasing device, said curving device consisting of a control device secured on the element and a transmission driven by said control device and connected to the support for angularly modifying the guiding direction of the steering bar by a pivotal movement of said support around a vertical axis.

5. A coupler according to claim 1 wherein, for one element, the means for transmitting the thrust, for guiding the steering bar, and for causing said steering bar and the corresponding distance increasing device to mutually act on each other comprise a pair of thrust bars projecting from the element and slidably mounted on either side of said element, a central support provided with a longitudinal groove engaged by the steering bar and pivotally mounted on the element around a vertical axis, opposed aligned arms mounted on said support and disposed at right angles to the longitudinal plane of symmetry of the element in aligned condition with the other element, two yielding connections pivotally connected by one of their ends to said aligned arms, respectively, while their other ends are longitudinally movable relative to the element, a funicular connection interconnecting the non-projecting ends of the thrust bars and the distance increasing device, two stationary pulleys symmetrically mounted on said element relative to its longitudinal plane of symmetry and over which said funicular connection passes, and means connecting the movable ends of said yielding connections to said distance increasing device.

6. A coupler according to claim 5, wherein the distance increasing device comprises a pulley block having a double pulley fixed on the element and a single movable pulley, said pulley block engaging the funicular connection at an intermediate point between the two stationary pulleys over which said connection passes, a pair of interconnected grooved pulleys one of which is circular while the other is spiral shaped, a pivot pin secured on the element and on which the pulleys of said pair are pivotally mounted, a cable connected to the movable ends of the yielding connections, passing through the groove of the circular pulley and fixed on said circular pulley, and a second cable connected to the single pulley of the pulley block, passing through the groove of the spiral shaped pulley and fixed on said spiral shaped pulley.

7. A coupler according to claim 5 further comprising, for each element, a curving device adapted to generate the relative pivotal movement around the vertical axis between the steering bar and the distance increasing device, said curving device consisting of a control device secured on the element and a transmission driven by said control device and connected to the support for angularly modifying the guiding direction of the steering bar by a pivotal movement of said support around a vertical axis.

8. A coupler according to claim 1, wherein the steering bar simultaneously acts as means for transmitting the thrust, and wherein, for each element, the means for guiding said steering bar the distance increasing device and the means for causing said steering bar and the corresponding distance increasing device to mutually act on each other comprise a central support provided with a longitudinal groove engaged by the steering bar and pivotally mounted on the element about a vertical and a horizontal axis at right angles to the longitudinal plane of symmetry of the element in aligned condition with the other element, a roller longitudinally secured on the corresponding end of said steering bar while pivotable around the axis thereof, and a vertical cam secured on the element, and engaging said roller, said cam having a substantially V-shape symmetrical with respect to said plane of symmetry with its apex directed towards the center of said element, the points of the profile of said cam from the apex of the V being situated at decreasing distance from the pivotal axis of said support, whereby said cam acts as said distance increasing device.

9. A coupler according to claim 8 further comprising, for each element, a curving device adapted to generate the relative pivotal movement around the vertical axis between the steering bar and the distance increasing device, said curving device consisting of a plate pivotally mounted on the element around the pivotal axis of the support and carrying the V-shaped cam, and means for rotatably driving said plate in an adjustable manner.

10. A coupler according to claim 1, wherein the steering bar simultaneously acts as means for transmitting the thrust, and wherein, for each element, the means for guiding said steering bar the distance increasing device and the means for causing said steering bar and the corresponding distance increasing device to mutually act on each other comprise a transverse plate symmetrical with respect to the longitudinal plane of symmetry of the element in aligned condition with the other element and acting as said distance increasing device, a transverse horizontal shaft carried by the lower edge of said plate and on which is pivotally mounted the corresponding end of the steering bar, means carried by the element for pivotally mounting said plate around an axis parallel to that of said shaft and for rotatably mounting said plate around its instantaneous center of rotation, simultaneously, said axis being located closer to the upper edge of the plate than said horizontal shaft, and means for connecting to the element one point of said transverse plate opposite to said shaft with respect to said axis.

11. A coupler according to claim 10, wherein the means for pivotally and rotatably mounting the transverse plate comprises two supports hingedly mounted on the element symmetrically with respect to the longitudinal plane of symmetry thereof around longitudinal parallel axes, a cross-bar interconnecting the tops of said supports and two bars converging towards the transversal edge of the element close to said supports and respectively connecting said tops with points of said plate symmetrically disposed with respect to said plane in aligned condition of the element with the other element.

12. A coupler according to claim 10 further comprising, for each element, a curving device adapted to generate the relative pivotal movement around the vertical axis between the steering bar and the distance increasing device, said curving device consisting of two main pulleys respectively mounted on the lateral edges of the transverse plate, two return pulleys fixed on the element symmetrically with respect to the longitudinal plane of symmetry of said element, and two cables each one of which passes on one side of said transverse plate over the main and return pulleys disposed on the same side of said plate; said cables respectively running along the train while respectively passing over the main pulleys of the transverse plates of the train with a view to ensure by applying a traction to one of said cables a rotary movement for all the transverse plates of the train around their instantaneous centers of rotation, respectively.

13. A coupler according to claim 10, for trains having at least one pair of laterally joined elements, wherein, for each pair of laterally joined elements, each distance increasing member symmetrically straddles the contiguous longitudinal edges of the laterally joined elements and is connected to a common point of the contiguous boards of said elements.

14. A coupler according to claim 10, for trains having at least one pair of laterally joined elements, wherein, for each pair of laterally joined elements, each distance increasing member symmetrically straddles the contiguous longitudinal edges of the laterally joined elements and is connected to the second transverse plate of the same pair of elements.

References Cited in the file of this patent

UNITED STATES PATENTS

| | | |
|---|---|---|
| 320,670 | McCabe | June 23, 1885 |
| 776,994 | Brennan | Dec. 6, 1904 |
| 798,189 | Koppel | Aug. 29, 1905 |